Aug. 31, 1926.
J. A. LIST
1,598,536
HOT PAN LIFTER AND REMOVER
Filed Nov. 25, 1925
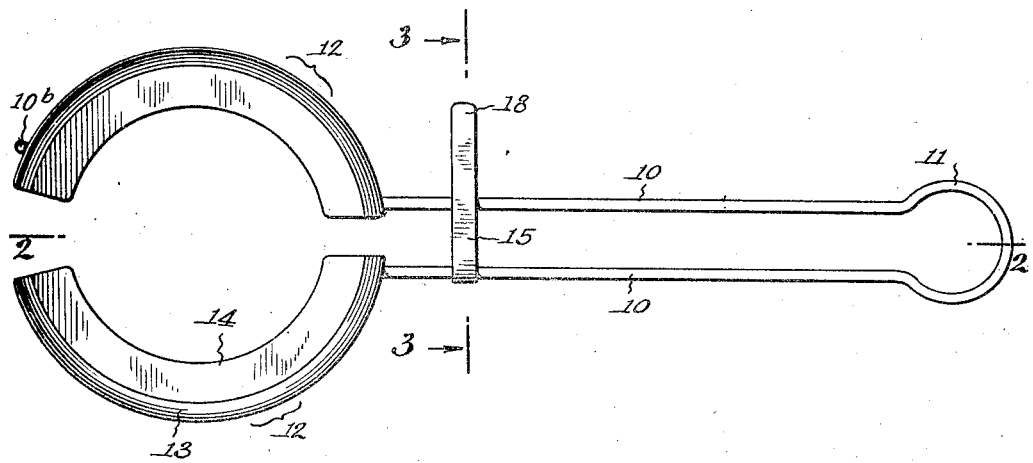
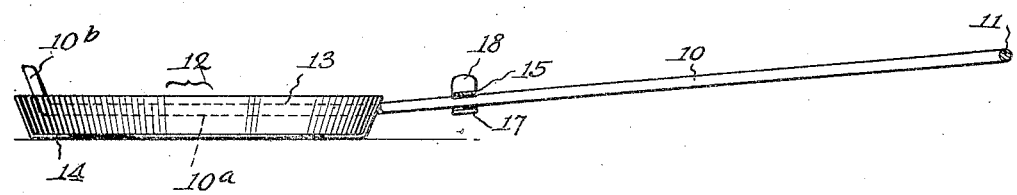
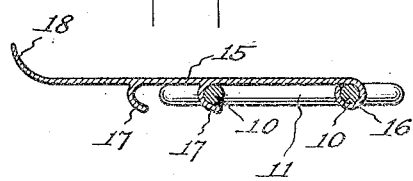
WITNESSES
INVENTOR
JOHN A. LIST
BY
ATTORNEYS Patented Aug. 31, 1926.

1,598,536

UNITED STATES PATENT OFFICE.

JOHN A. LIST, OF CARLYLE, ILLINOIS.

HOT-PAN LIFTER AND REMOVER.

Application filed November 25, 1925. Serial No. 71,391.

The device of the present invention is in the nature of a tool, particularly adapted for removing hot cooking vessels such as pans or pots from an oven or from a stove. The device has a rather wide range of utility as a kitchen implement, but is especially designed for the purpose of handling hot pie pans or the like.

An object of the invention is to provide a device of this character by which an operator may safely manipulate a hot pan without danger of burning the operator, or without danger of upsetting or spilling the contents of a pan.

A further object is to provide a device of this character which is adjustable to accommodate various sizes of pans and which may be both applied and removed without the necessity for the hands of an operator coming in contact with the pan or with the portion of the tool which is heated by the pan.

A further object is to provide a tool of this character which will be of simple, practical construction, which will be rugged, durable and efficient in use, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein Fig. 1 is a top plan view of a hot pan lifter embodying the invention.

Fig. 2 is a view in longitudinal section on the line 2—2 of Fig. 1.

Fig. 3 is a transverse sectional view on the line 3—3 of Fig. 1.

The device of the present invention preferably includes a spring handle member including a pair of arms 10 of spring wire or other resilient material connected at one end by a bight 11. Each of the arms at its free end carries an arcuate pan engaging and receiving member 12. Each member 12 is approximately semi-circular in shape and is attached throughout its length to the curving end 10$^a$ of its handle 10. Each element 12 includes an outwardly flaring vertical flange portion 13, and a horizontally disposed inwardly projecting flange or seat portion 14 adapted for insertion under a vessel to be lifted.

From the foregoing description it will be apparent that when the spring arms are manually advanced toward each other against the spring action of the bight 11, the two members 12 will engage opposite sides of a pan or other vessel, the flanges 14 supporting the vessel, and the flanges 13 preventing lateral movement thereof. Handles 10 might be squeezed together manually with sufficient force to successfully prevent spreading of the members 12 during the operation of lifting a pan, but I prefer to utilize a locking mechanism for limiting the spreading of the arms when a pan is in place on the members 12.

The locking device which I have illustrated includes a swinging latch member 15 formed with an eye 16 encircling and slidable along one of the arms 10. The eye carries a plurality of downwardly projecting hook portions 17 selectively engageable with the other arm 10 to limit relative spread of the arms, and may be formed with an upturned handle end 18.

By virtue of the sliding movement of the latch member 15 along the arms, and by virtue of the series of hooks 17, it will be seen that the arms may be locked in various adjusted positions against further spreading movement, so that the tool may be conveniently utilized for handling a wide range of sizes of cooking utensils.

While I have illustrated one of the preferred embodiments of the invention, it will be understood that numerous changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

It will be noted that one, or if desired, both of the handle ends 10$^a$ may be turned upwardly at the edge of element 12. This hook may be used for engaging a pan to pull the same forwardly in the oven to a convenient position for removal or may be used for shifting the pans about in the oven.

I claim:

1. A tool of the class described including a pair of handle members connected together by an element tending to spread their free ends, arcuate members at the free ends of the handles adapted to engage under opposite sides of a cooking vessel, each of said members including an arcuate vertical flange engaging the side of said vessel, and an arcuate horizontal flange adapted to be inserted under said vessel, handle members including a length of spring wire, the intermediate portion of which is curved to provide a spring bight, and the extremities of which are shaped in conformity with the pan engaging elements and secured to the exterior of the vertical flange portions thereof, one end of the wire being turned upwardly at its free end to provide a finger projecting above the upper edge of the pan engaging elements.

2. A device of the class described including a length of spring wire bent to provide an intermediate spring bight portion and a pair of handle arms, pan engaging elements carried by the ends of the arms, and means for limiting the relative separation of the arms, including a metallic strap, one end of which is curved around one of the spring arms to afford a sliding hinged connection, a plurality of hooks depending from the under face of the intermediate portion of the strap, and selectively engageable with the other arm to limit relative separation of the arms, the free extremity of the strap being turned upwardly to provide a finger grip.

JOHN A. LIST.